(12) United States Patent
Kuan et al.

(10) Patent No.: US 9,735,681 B2
(45) Date of Patent: Aug. 15, 2017

(54) VOLTAGE CONVERTER

(71) Applicant: MediaTek Inc., Hsin-Chu (TW)

(72) Inventors: Chien-Wei Kuan, Hsinchu (TW); Yen-Hsun Hsu, Hengshan Township, Hsinchu County (TW); Tun-Shih Chen, Linluo Township, Pingtung County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/038,575

(22) PCT Filed: Jan. 14, 2015

(86) PCT No.: PCT/CN2015/070668
§ 371 (c)(1),
(2) Date: May 23, 2016

(87) PCT Pub. No.: WO2015/106681
PCT Pub. Date: Jul. 23, 2015

(65) Prior Publication Data
US 2016/0301302 A1    Oct. 13, 2016

Related U.S. Application Data

(60) Provisional application No. 61/927,135, filed on Jan. 14, 2014.

(51) Int. Cl.
*H02M 3/158* (2006.01)
*H02M 1/08* (2006.01)
(Continued)

(52) U.S. Cl.
CPC ............ *H02M 3/158* (2013.01); *H02M 1/08* (2013.01); *H02M 3/1584* (2013.01); *H02M 3/04* (2013.01);
(Continued)

(58) Field of Classification Search
CPC ....... H02M 3/1584; H02M 2001/0009; H02M 2001/0019; H02M 2003/1586; H02M 3/04; H02M 3/155; H02M 1/08
(Continued)

(56) References Cited

U.S. PATENT DOCUMENTS 6,670,794 B1    12/2003  Wang et al.
7,414,383 B2 *   8/2008  Burton ................ H02M 3/1584
                                                                  323/271
(Continued)

FOREIGN PATENT DOCUMENTS

| CN | 1504851 | 6/2004 |
| CN | 101075740 | 11/2007 |
| CN | 101286698 | 10/2008 |

OTHER PUBLICATIONS

International Search Report dated Mar. 25, 2015, issued in application No. PCT/CN2015/070668.

*Primary Examiner* — Kyle J Moody
(74) *Attorney, Agent, or Firm* — McClure, Qualey & Rodack, LLP

(57) ABSTRACT

A voltage converter is provided. The voltage converter includes a compensation circuit, a first comparator circuit, a first inductor, a first driver circuit, and a phase-lag circuit. The compensation circuit generates a first compensation signal according to a loading state of the voltage converter. The first comparator circuit compares the first compensation signal and a first reference signal to generate a first comparison signal. The first driver circuit generates a first driving voltage to the first inductor according to the first comparison signal. The phase-lag circuit is coupled between the first comparison circuit and the first driver. The phase-lag circuit modifies a duty of the first comparison signal for changing a first inductor current following the first inductor.

8 Claims, 3 Drawing Sheets

(51) Int. Cl.
  *H02M 1/00* (2006.01)
  *H02M 3/04* (2006.01)
(52) U.S. Cl.
  CPC ............... *H02M 2001/0009* (2013.01); *H02M 2001/0019* (2013.01); *H02M 2003/1586* (2013.01)
(58) Field of Classification Search
  USPC ........ 323/225, 271, 272, 283, 284, 212, 213
  See application file for complete search history.

(56) References Cited

U.S. PATENT DOCUMENTS

| | | | |
|---|---|---|---|
| 7,592,787 B2 * | 9/2009 | Qui | H02M 3/285 323/272 |
| 7,733,675 B2 * | 6/2010 | Wu | H02M 3/1584 323/271 |
| 8,085,015 B2 | 12/2011 | Lee | |
| 8,232,782 B2 * | 7/2012 | Houston | H02M 3/1584 323/272 |
| 8,618,788 B2 | 12/2013 | Trivedi et al. | |
| 9,024,599 B2 * | 5/2015 | Huang | G05F 1/59 323/272 |
| 9,496,791 B2 * | 11/2016 | Ejury | H02M 3/1584 |
| 2004/0008011 A1 | 1/2004 | Wang et al. | |
| 2009/0051335 A1 | 2/2009 | Huang | |
| 2010/0019751 A1 | 1/2010 | Chen et al. | |
| 2013/0027134 A1 | 1/2013 | Zhu | |
| 2013/0038312 A1 | 2/2013 | Wang | |

\* cited by examiner

VOLTAGE CONVERTER

CROSS REFERENCE TO RELATED APPLICATIONS

This application claims the benefit of U.S. Provisional Application No. 61/927,135, filed on Jan. 14, 2014, the contents of which are incorporated herein by reference.

TECHNICAL FIELD

The invention relates to a voltage converter, and more particularly to a voltage converter with balanced inductor currents.

BACKGROUND

Generally, a multiple phase DC/DC converter has several inductors coupled to an output terminal of the DC/DC converter. Due to variations in manufacturing processes, these inductors may be not matched with each other. When there is mismatch for several inductors of a DC/DC, currents following the inductors may be unbalanced, and most output current of the DC/DC converter is concentrated into one certain inductor. This situation may cause the inductor through which a greater current to be broken, and even causes degradation of the efficiency of the DC/DC converter.

SUMMARY

Thus, it is desirable to provide a voltage converter which is capable of balancing inductor currents, thereby preventing the inductor from being broken by a greater current and enhancing efficiency of the voltage converter.

An exemplary embodiment of a voltage converter is provided. The voltage converter generates an output voltage at an output terminal and comprises a compensation circuit, a first comparator circuit, a first inductor, a first driver circuit, and a phase-lag circuit. The compensation circuit generates a first compensation signal according to a loading state of the voltage converter. The first comparator circuit receives the first compensation signal and a first reference signal and compares the first compensation signal and the first reference signal to generate a first comparison signal. The first inductor is coupled to the output terminal. The first driver circuit generates a first driving voltage to the first inductor according to the first comparison signal. The phase-lag circuit is coupled between the first comparison circuit and the first driver. The phase-lag circuit modifies a duty of the first comparison signal for changing a first inductor current following the first inductor.

In an embodiment, the phase-lag circuit modifies the duty of the first comparison signal according to a current value of the first inductor current. The first inductor current is changed to have an adjusted value in response to the modified duty of the first comparison signal.

In an embodiment, the voltage converter further comprises a correction circuit. The correction circuit senses the first inductor current and generates a first correction signal according to a sensing result related to the first indictor current to the phase-lag circuit. The phase-lag circuit modifies the duty of the first comparison signal according to the first correction signal.

Another exemplary embodiment of a modifying method for a voltage converter is provided. The voltage converter generates an output voltage. The modifying method comprises steps of generating a first compensation signal according to a loading state of the voltage converter; comparing the first compensation signal and a first reference signal to generate a first comparison signal; generating a first driving voltage to a first inductor, which is coupled to the output terminal, according to the first comparison signal; and modifying a duty of the first comparison signal for changing a first inductor current according to the first correction signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
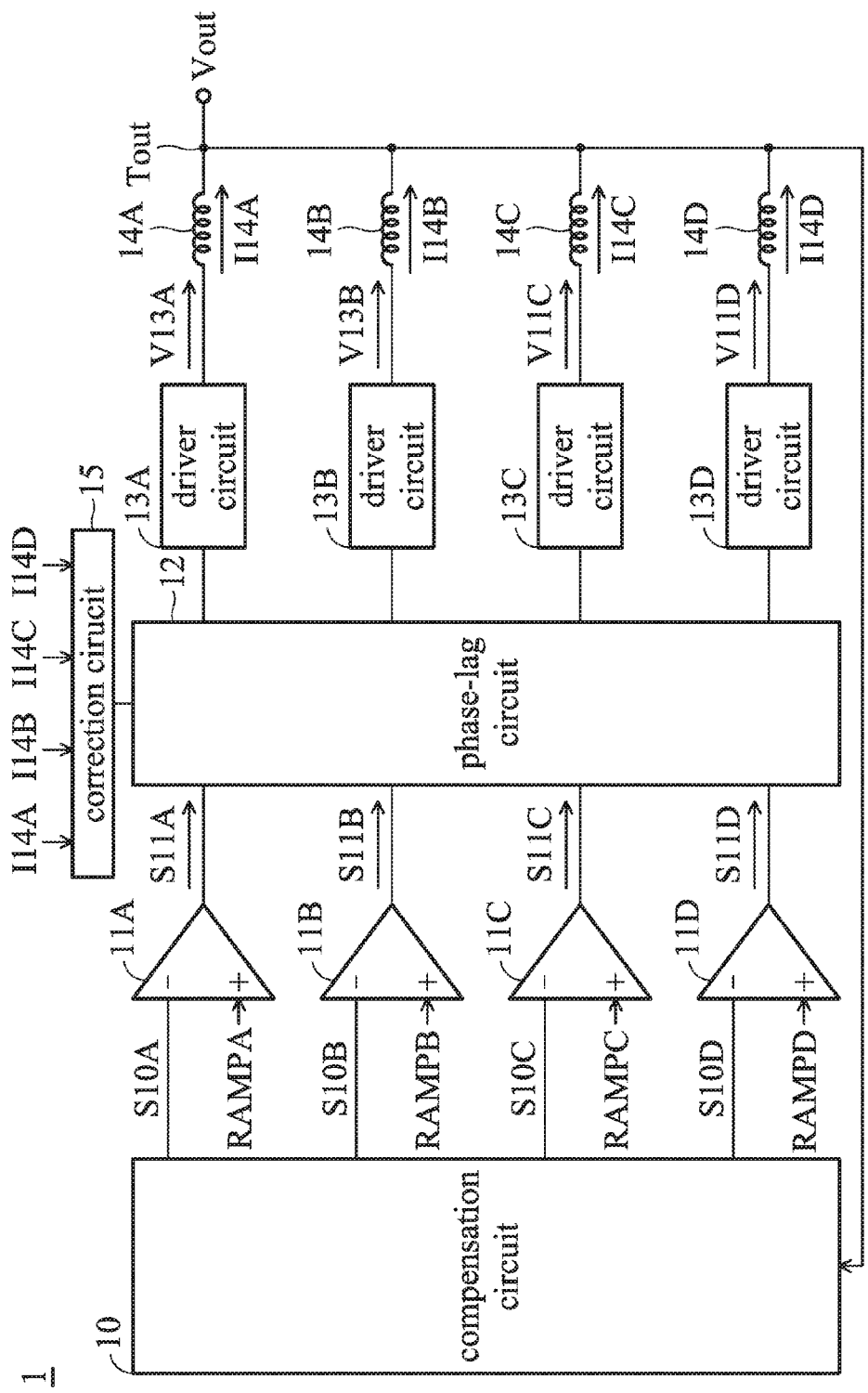
FIG. 1 shows an exemplary embodiment of a voltage converter.

Voltage converters are provided. In an exemplary embodiment shown in FIG. 1, a voltage converter 1 generates an output voltage Vout at an output terminal Tout. In the embodiment, the voltage converter 1 is a multiple phase DC/DC voltage converter. Referring to FIG. 1, a four-phase DC/DC voltage converter is given as an example for the voltage converter 1. In response to the four-phase structure, the voltage converter 1 comprises a compensation circuit 10, four comparators 11A-11D, a phase-lag circuit 12, four driver circuits 13A-13D, four inductors 14A-14D, and a correction circuit 15. The compensation circuit 10 detects the loading state of the voltage converter 1 and generates four compensation signals S10A-S10D according to the detection result. In the embodiment, the compensation circuit 10 may detect the loading states of the voltage converter 1 by sensing inductor currents following the inductors 14A-14D or measuring the output voltage Vout. Negative input terminals of the four comparators 11A-11D which correspond to the four phases receive the compensation signals S10A-S10D respectively. A positive input terminal of each comparator receives a respective reference signal for comparison operation. In the embodiment, ramp signals are given as an example for the reference signals. In detailed, the positive input terminals of the comparators 11A-11D receive ramp signals RAMPA-RAMPD respectively. Each comparator compares the respective compensation signal with the ramp signal to generate a corresponding comparison signal. For example. The comparator 11A compares the compensation signal S10 with the ramp signal RAMPA and generates a comparison signal S11A according to the comparison result. The comparators 11B-11D perform the same comparison operation as the comparator 11A to respectively generate comparison signals S11B-S11D. In the embodiment, the ramp signals RAMPA-RAMPD have sawtooth waveforms.

The phase-lag circuit 12 is coupled to the comparators 11A-11D to respectively receive the comparison signal S11A-S11D. The phase-lag circuit 12 is controlled by the correction circuit 15. The phase-lag circuit 12 modifies a duty of each of the comparison signals S11A-S11D according to the controlling of the correction circuit 15. For each comparison signal, in the case where the phase-lag circuit 12 is controlled to modify the duty of the comparison, the phase-lag circuit 12 further decides to modify the duty of the comparison signal to be less or greater according to the controlling of the correction circuit 15. The comparison signals S11A-S11D processed through the phase-lag circuit 12 are then transmitted to the driver circuits 13A-13D, respectively.

When each driver circuit receives the corresponding comparison signal from the phase-lag circuit 12, the driver circuit generates a driving voltage according to the received comparison signal, and the driving voltage is applied to the corresponding inductor. For example, the driver circuit 13A receives the comparison signal S11A processed through the phase-lag circuit 12 and generates a driving voltage V13A. The driving voltage V13A is applied to the inductor 14A. The other driver circuits 13B-13D perform the same operation as the driver circuit 13A to respectively generate driving voltages V13B-V13D. The driving voltages V13B-V13D are applied to the inductors 14B-14D respectively. Through applying the driving voltage V13A-V13D to the inductors 14A-14D respectively, the output voltage Vout is generated at the output terminal Tout.

According to the above embodiment, through the modification operation of the duties of the comparison signals S11A-S11D by the phase-lag circuit 12, the driving voltages V13A-V13D are changed, and inductor currents I14A-I14D respectively flowing the inductors 14A-14D is thus adjusted to have an adjusted value. Accordingly, in the case where there is mismatch for the inductors 14A-14D, the balance between the inductor currents I14A-I14D is achieved. Moreover, in the embodiment, the modification of the duties of the comparison signals S11A-S11D is performed after the comparators 11A-11D, which simplifies the process for balancing the inductor currents I14A-I14D.

In the above embodiment, a four-phase DC/DC voltage converter is given as an example for the voltage converter 1. However, in other embodiment, the number of phases of the voltage converter 1 can be determined according to system requirement.

Figure 2:
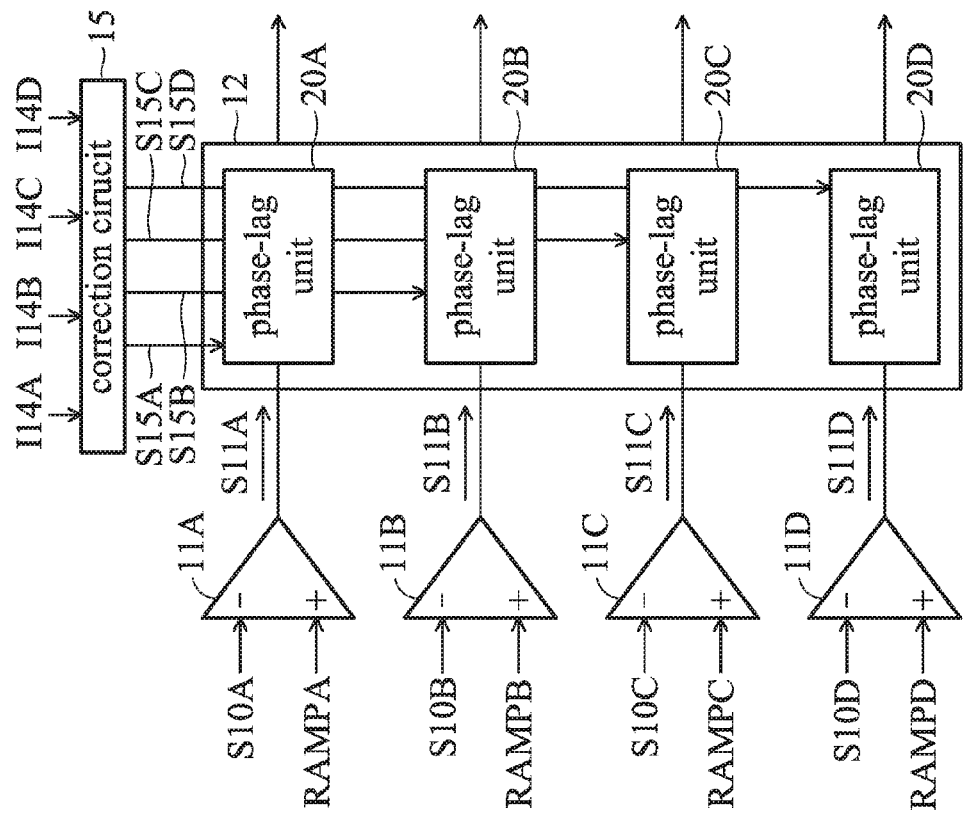
FIG. 2 shows an exemplary embodiment of a phase-lag circuit of the voltage converter in FIG. 1.

FIG. 2 shows an exemplary embodiment of the phase-lag circuit 12. In order to illustrate the structure and operation of the phase-lag circuit 12 clearly, FIG. 2 also shows the comparators 11A-11D and the correction circuit 15. Referring to FIG. 2, the phase-lag circuit 12 comprises four phase-lag units 20A-20D. The phase-lag units 20A-20D are coupled to the comparator 11A-11B to receive the comparison signals S11A-S11D, respectively. The phase-lag units 20A-20D are also coupled to the correction circuit 15 and controlled by the correction circuit 15. In the embodiment, the correction circuit 15 is used to sense the inductor currents I14A-I14D for obtaining the current values of the inductor currents I14A-I14D. According to the sensing result, the correction circuit 15 identifies whether the inductor currents I14A-I14D are balanced to each other and decides how to modify the duties of the comparison signals S11A-S11D. Then, the correction circuit 15 generates correction signals S15A-S15D for the phase-lag units 20A-20D respectively according to the sensing result. Each phase-lag unit receives the corresponding correction signal and is controlled by the corresponding correction signal to modify the duty of the comparison signal to be less or greater. The degrees of the modification of the duties of the comparison signals S11A-S11D are not the same, and the directions (+ or −) thereof are not the same either. The degrees and the directions of the modification of the duties of the comparison signals S11A-S11D are determined according to the correction signals S15A-S15D, which are generated according to the sensing result obtained by the correction circuit 15.

Figure 3:
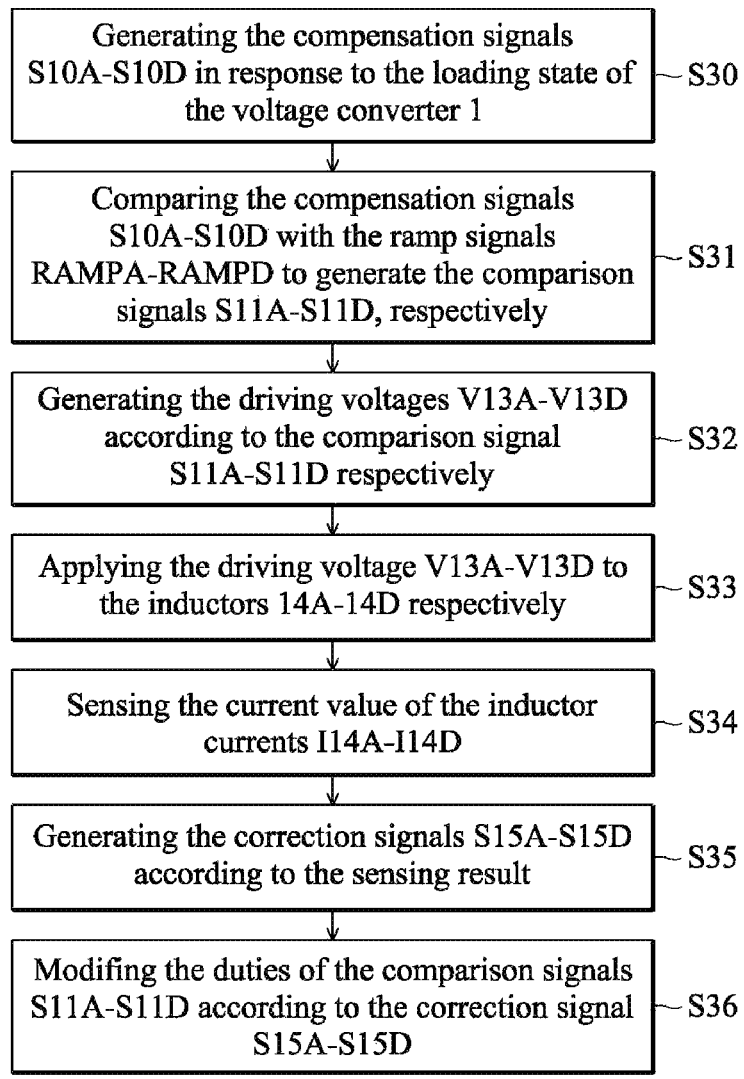
FIG. 3 shows an exemplary embodiment of a modifying method.

FIG. 3 shows an exemplary embodiment of a modification method for the voltage converter 1. In the following, the modification method will be illustrated by referring to FIGS. 1 and 3. In step S30, the compensation signals S10A-S10D are generated in response to the loading state of the voltage converter 1. After the generation of the compensation signals S10A-S10D, the compensation signals S10A-S10D are compared with the ramp signals RAMPA-RAMPD to generate the comparison signals S11A-S11D, respectively (step S31). The driving voltages V13A-V13D are generated according to the comparison signal S11A-S11D (step S32) respectively, and the driving voltage V13A-V13D are applied to the inductors 14A-14D respectively. (step S33). When the driving voltage V13A-V13D are applied to the inductors 14A-14D, the corresponding inductor currents I14A-I14D are induced. Then, the current value of the inductor currents I14A-I14D are sensed (step S34), and the correction signals S15A-S15D are generated according to the sensing result (step S35). The duties of the comparison signals S11A-S11D are modified according to the correction signal S15A-S15D respectively (step S35). Through the modification of the duties of the comparison signals S11A-S11D, each of the inductor currents I14A-I14D is changed to have an adjusted value.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A voltage converter generating an output voltage at an output terminal comprising:
   a compensation circuit generating a first compensation signal according to a loading state of the voltage converter;
   a first comparator circuit receiving the first compensation signal and a first reference signal and comparing the first compensation signal and the first reference signal to generate a first comparison signal;
   a first inductor coupled to the output terminal;
   a first driver circuit generating a first driving voltage to the first inductor according to the first comparison signal;
   a phase-lag circuit, coupled between the first comparison circuit and the first driver circuit, receiving the first comparison signal, and modifying a duty of the first comparison signal for changing a first inductor current flowing through the first inductor; and
   a correction circuit generating a first correction signal, according to the first inductor current, to the phase-lag circuit,
   wherein the phase-lag circuit modifies the duty of the first comparison signal only according to the first correction signal.

2. The voltage converter as claimed in claim 1, wherein the first inductor current is changed to have an adjusted value in response to the modified duty of the first comparison signal.

3. The voltage converter as claimed in claim 1, further comprising:
   a second comparator circuit coupled to the compensation circuit, wherein the compensation circuit generates a second compensation signal according to the loading state of the voltage converter, and the second comparator circuit receives the second compensation signal and a second reference signal and compares the second compensation signal and the second reference signal to generate a second comparison signal;
   a second inductor coupled to the output terminal; and
   a second driver circuit generating a second driving voltage to the second inductor according to the second comparison signal,
   wherein the phase-lag circuit modifies a duty of the second comparison signal for changing a second inductor current flowing through the second inductor.

4. The voltage converter as claimed in claim 3,
   wherein the correction circuit further generates a second correction signal, according to the second inductor current, to the phase-lag circuit, and
   wherein the phase-lag circuit modifies the duty of the second comparison signal only according to the second correction signal.

5. A modifying method for a voltage converter which generates an output voltage, comprising:
   generating a first compensation signal according to a loading state of the voltage converter;
   comparing the first compensation signal and a first reference signal to generate a first comparison signal;
   generating a first driving voltage to a first inductor, which is coupled to an output terminal, according to the first comparison signal;
   modifying a duty of the first comparison signal, via a phase-lag circuit, for changing a first inductor current flowing through the first inductor according to a first correction signal,
   generating the first correction signal, according to the first inductor current, to the phase-lag circuit, and
   wherein the duty of the first comparison signal is modified only according to the first correction signal.

6. The modifying method as claimed in claim 5, wherein the first inductor current is changed to have an adjusted value in response to the modified duty of the first comparison signal.

7. The modifying method as claimed in claim 5, further comprising:
   generating a second compensation signal according to the loading state of the voltage converter;
   comparing the second compensation signal and a second reference signal to generate a second comparison signal;
   generating a second driving voltage to a second inductor, which is coupled to the output terminal, according to the second comparison signal; and
   modifying a duty of the second comparison signal for changing a second inductor current flowing through the second inductor coupled.

8. The modifying method as claimed in claim 7, further comprising:
   generating a second correction signal, according to the second inductor current, to the phase-lag circuit,
   wherein the duty of the second comparison signal is modified only according to the second correction signal.

* * * * *